(12) United States Patent
Gurvich et al.

(10) Patent No.: US 12,264,704 B2
(45) Date of Patent: Apr. 1, 2025

(54) FOIL JOURNAL BEARING WITH BUMP FOIL CONFIGURED FOR SELF-ADJUSTED RADIAL POSITIONING

(71) Applicant: Hamilton Sundstrand Corporation, Charlotte, NC (US)

(72) Inventors: Mark R. Gurvich, Middletown, CT (US); Ali Shakil, West Hartford, CT (US); Viktor Kilchyk, Lancaster, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 99 days.

(21) Appl. No.: 18/186,430

(22) Filed: Mar. 20, 2023

(65) Prior Publication Data

US 2024/0318684 A1    Sep. 26, 2024

(51) Int. Cl.
*F16C 17/02*    (2006.01)
*F16C 43/02*    (2006.01)

(52) U.S. Cl.
CPC ............ *F16C 17/024* (2013.01); *F16C 43/02* (2013.01)

(58) Field of Classification Search
None
See application file for complete search history.

(56) References Cited

U.S. PATENT DOCUMENTS

| | | | |
|---|---|---|---|
| 4,295,689 A * | 10/1981 | Licht | F16C 27/02 384/103 |
| 4,415,281 A | 11/1983 | Agrawal | |
| 5,584,582 A | 12/1996 | Brown | |
| 6,964,522 B2 | 11/2005 | Kang et al. | |
| 7,108,488 B2 | 9/2006 | Larue et al. | |
| 7,494,282 B2 | 2/2009 | Lee | |
| 8,801,290 B2 | 8/2014 | Heshmat | |
| 9,109,622 B2 | 8/2015 | Meacham et al. | |
| 10,487,871 B2 | 11/2019 | Lee et al. | |
| 2002/0106138 A1 * | 8/2002 | Akizuki | F16C 43/02 384/106 |
| 2006/0062500 A1 * | 3/2006 | Struziak | F16C 17/042 384/106 |
| 2007/0047858 A1 | 3/2007 | Hurley et al. | |
| 2019/0101163 A1 | 4/2019 | Haines et al. | |

FOREIGN PATENT DOCUMENTS

GB    566572 A    1/1945

OTHER PUBLICATIONS

European Search Report issued in European Application No. 24164894.8 dated Aug. 7, 2024; 10 pages.

* cited by examiner

*Primary Examiner* — James Pilkington
*Assistant Examiner* — Aimee Tran Nguyen
(74) *Attorney, Agent, or Firm* — CANTOR COLBURN LLP

(57) ABSTRACT

A foil journal bearing, having: a shaft; a top foil surrounding the shaft in a circumferential direction; a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and a bearing sleeve surrounding the corrugated bump foil, wherein: at least one of the sidewalls of at least one of the corrugations includes an undulation disposed between the outer and inner radial ends of the sidewall; and the undulation is defined by an undulation outer end and an undulation inner end.

18 Claims, 8 Drawing Sheets

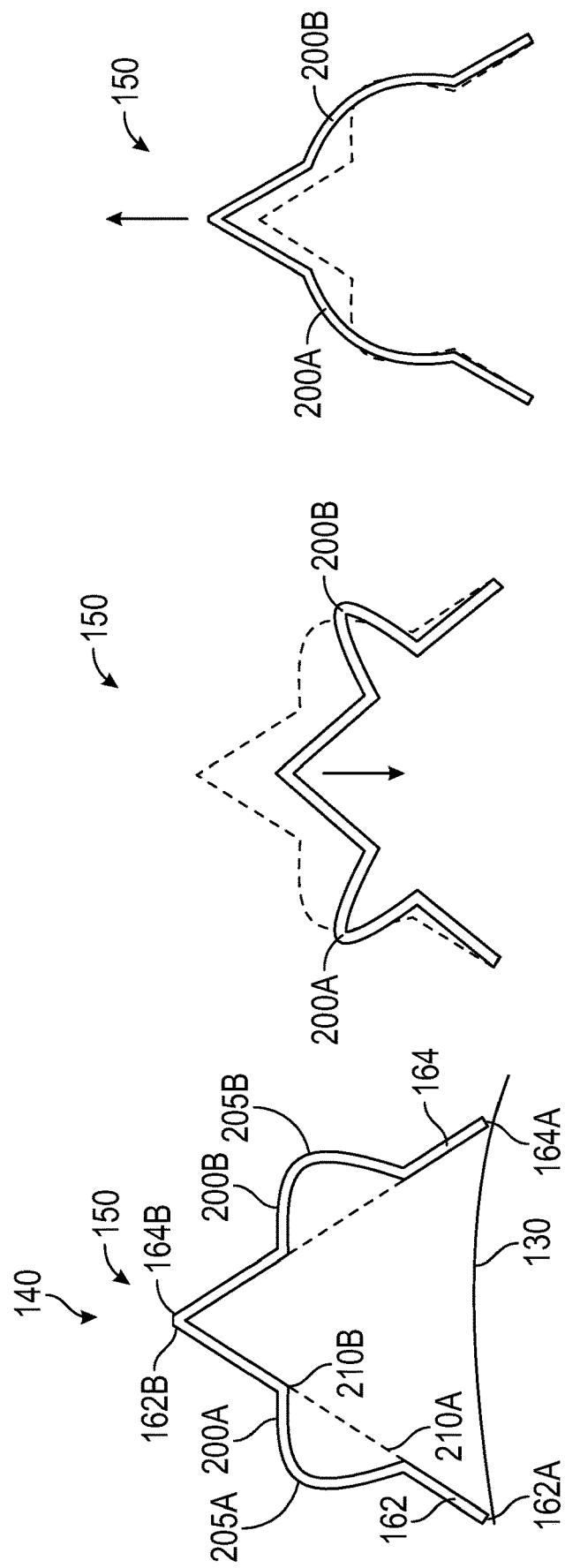

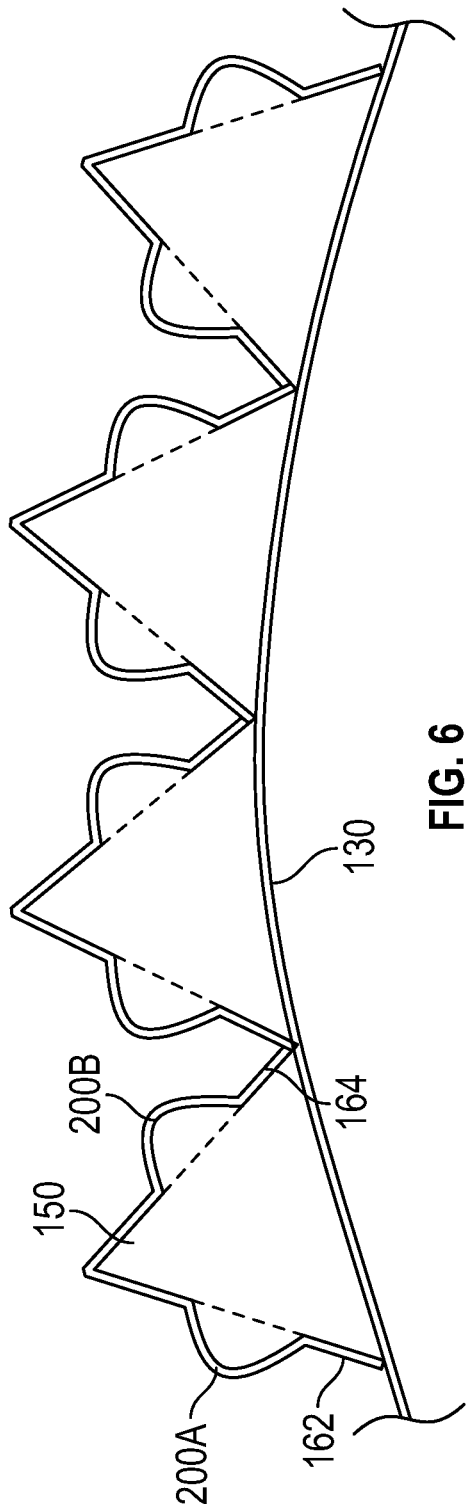

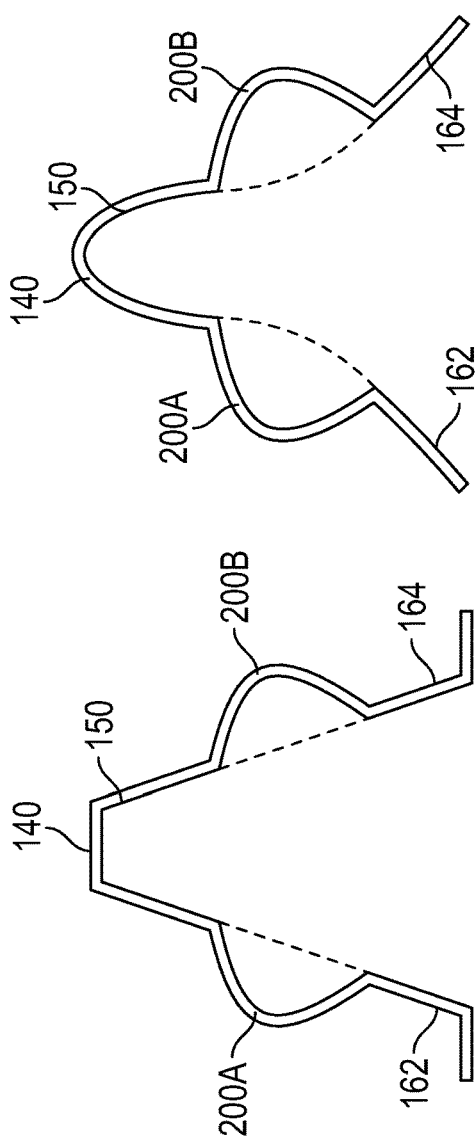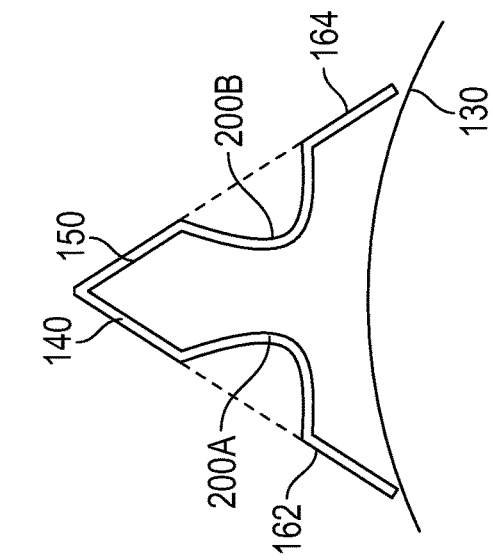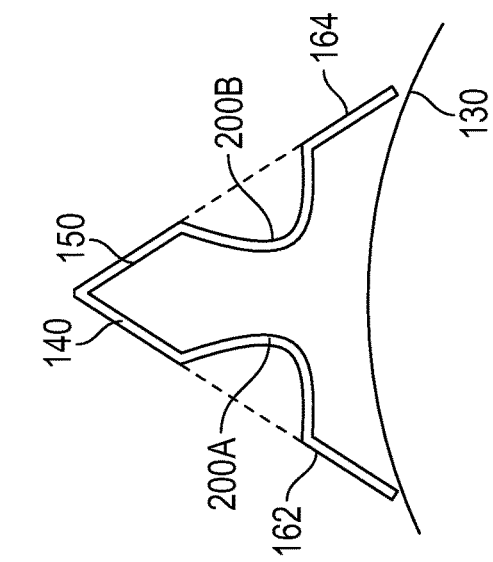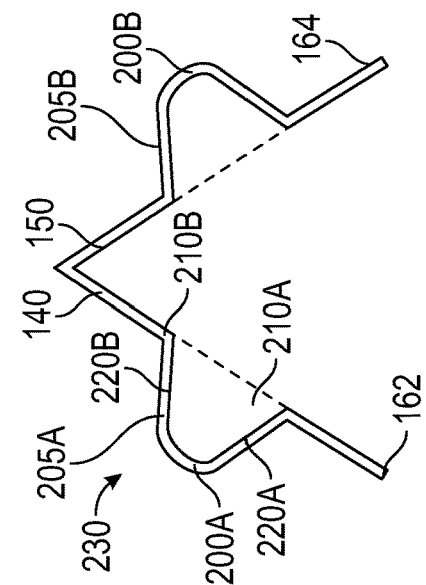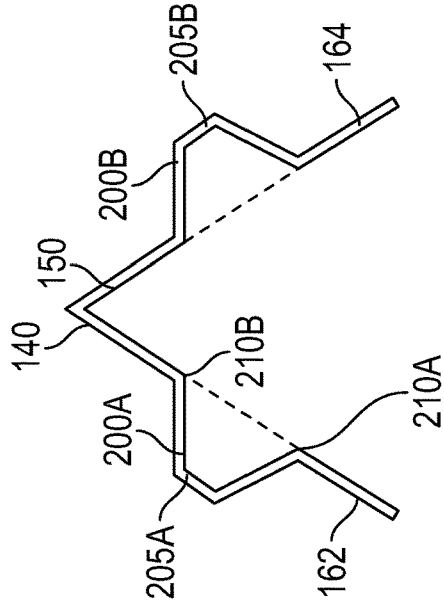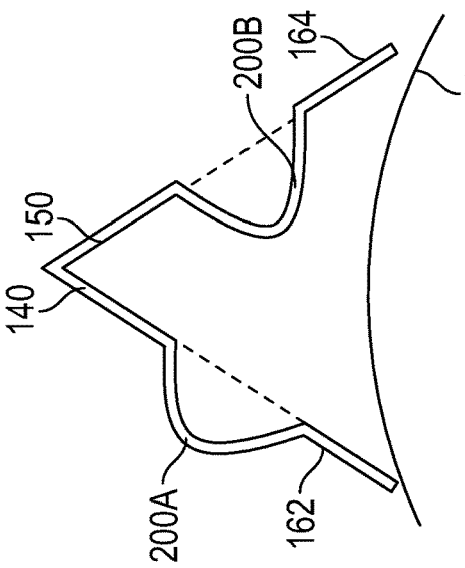

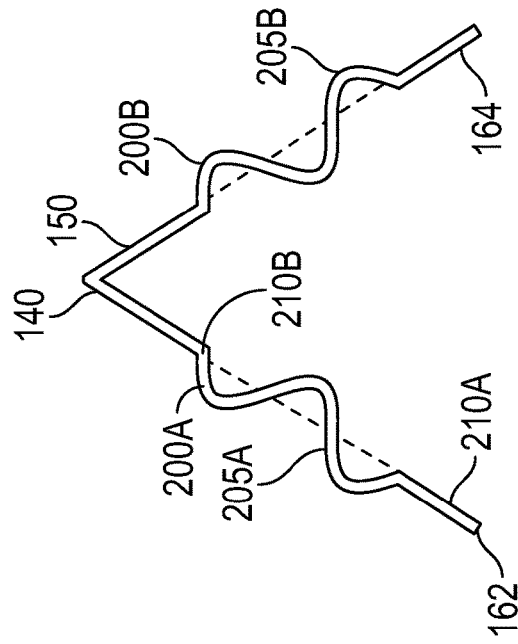
FIG. 14
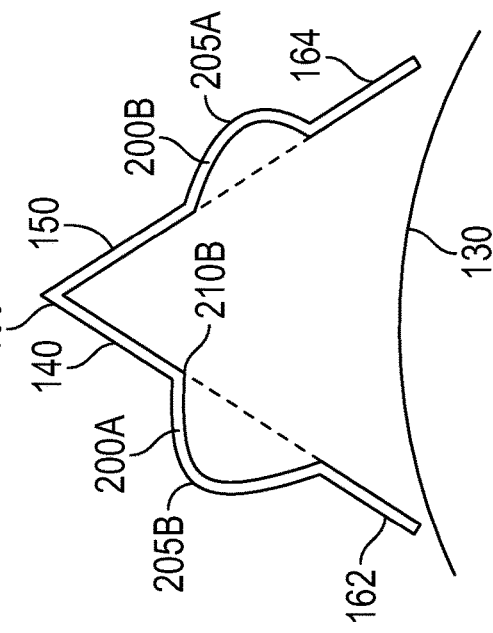
FIG. 15
FIG. 16
FIG. 17

FOIL JOURNAL BEARING WITH BUMP FOIL CONFIGURED FOR SELF-ADJUSTED RADIAL POSITIONING

BACKGROUND

The embodiments relate to bearings and more specifically to a foil bearing journal with a bump foil, configured for self-adjusting radial positioning.

Foil journal bearing (FJB) have spring elements, also known as bump foils, that may have corrugated designs, consisting of combination of connected periodic shapes. These shapes in a diametric cross-sectional view can be schematically described as having a curved or flat bottom or top and planar side walls. Stiffnesses and load-capacities of an FJB may rely on a thickness, geometry and materials of the corrugations of the spring elements. Additionally, hydrodynamic coulomb damping of a FJB may rely on points of contact between the corrugations in the spring elements and the radially adjacent mating surface with the bearing sleeve of the FJB. Due to inevitable geometrical variability of fabricated foils and service misalignments, different segments of the foils can exhibit some non-uniformity of load transfer, especially, in the radial direction. Such non-uniformity may limit the stiffness and damping capability of the FJB to support operational dynamic loads of turbomachinery.

BRIEF SUMMARY

Disclosed is a foil journal bearing, including: a shaft; a top foil surrounding the shaft in a circumferential direction; a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and a bearing sleeve surrounding the corrugated bump foil, wherein: at least one of the sidewalls of at least one of the corrugations includes an undulation disposed between the outer and inner radial ends of the sidewall; and the undulation is defined by an undulation outer end and an undulation inner end.

In addition to one or more aspects of the bearing or as an alternate, the corrugations define a triangular shape.

In addition to one or more aspects of the bearing or as an alternate, the corrugations define a trapezoidal waveform.

In addition to one or more aspects of the bearing or as an alternate, the corrugations define a sinusoidal or quasi-sinusoidal waveform having curved segments along its profile, having either continuous or variable curvatures along the profile length In addition to one or more aspects of the bearing or as an alternate, the undulation of the at least one of the corrugations extends outwardly from the at least one of the sidewalls, away from the top foil.

In addition to one or more aspects of the bearing or as an alternate, both of the sidewalls of the at least one of the corrugations includes the undulations, wherein the undulations extend outwardly, away from the top foil.

In addition to one or more aspects of the bearing or as an alternate, the undulation of the at least one of the sidewalls extends inwardly, toward the top foil.

In addition to one or more aspects of the bearing or as an alternate, both of the sidewalls of the at least one of the corrugations includes the undulations, wherein the that extend inwardly, toward the top foil.

In addition to one or more aspects of the bearing or as an alternate, each of the sidewalls of the at least one of the corrugations includes the undulations, wherein one of the undulations extends outwardly, away from the top foil, and another one of the undulations extend inwardly, toward the top foil.

In addition to one or more aspects of the bearing or as an alternate, the undulation of the at least one of the corrugations defines a continuously curved profile.

In addition to one or more aspects of the bearing or as an alternate, the undulation of the at least one of the corrugations defines a trapezoidal profile.

In addition to one or more aspects of the bearing or as an alternate, the undulation of the at least one of the corrugations defines a profile that includes a plurality of linear segments extending away from the top foil and a curved portions joining the plurality of linear segments.

In addition to one or more aspects of the bearing or as an alternate, the undulation of the at least one of the corrugations defines an S-shaped profile, including two connected individual waves extending inwardly and outwardly, respectively.

In addition to one or more aspects of the bearing or as an alternate, the undulation of the at least one of the corrugations defines a profile, including more than two connected individual waves extending inwardly and outwardly, one after another, respectively.

In addition to one or more aspects of the bearing or as an alternate, the corrugations define a symmetric triangular waveform; and the sidewalls of the at least one of the corrugations includes the undulations that extend outwardly, away from the top foil, and the undulations have the same shape as each other.

In addition to one or more aspects of the bearing or as an alternate, the corrugations define a symmetric triangular waveform; and the sidewalls of the at least one of the corrugations includes the undulations, wherein the undulations extend outwardly, away from the top foil, and one of the undulations has a different shape than another one of the undulations.

In addition to one or more aspects of the bearing or as an alternate, the corrugations define an asymmetric triangular waveform; and the sidewalls of the at least one of the corrugations includes the undulations that extend outwardly, away from the top foil, and have the same or a different shape from each other.

In addition to one or more aspects of the bearing or as an alternate, the bump foil includes alternating corrugations with sidewall undulations and corrugations without sidewall undulations.

Disclosed is a method of manufacturing a foil journal bearing, including: obtaining bump foil; and forming a bump foil with undulations by: rolling the bump foil between a pair of externally toothed rollers to impart a profile in the bump foil that defines adjacently disposed corrugations, wherein the corrugations include sidewalls that converge at a corrugation radial outer end, and at least one of the sidewalls of at least one of the corrugations include one of the undulations between the radial top and bottom ends of the sidewalls.

In addition to one or more aspects of the method or as an alternate, the method includes surrounding a shaft with a top foil; surrounding the top foil with the bump foil; and surrounding the bump foil with a bearing sleeve.

BRIEF DESCRIPTION OF THE DRAWINGS

The present disclosure is illustrated by way of example and not limited in the accompanying figures in which like reference numerals indicate similar elements.

FIG. 3 shows the bump foil with sidewall undulations in a normal state;

FIG. 4 shows the bump foil with sidewall undulations in a radially compressed state;

FIG. 5 shows the bump foil with sidewall undulations in a radially expanded state;

FIG. 6 shows the bump foil with sidewall undulations in each corrugation;

FIG. 7 shows the bump foil having both corrugations with and without sidewall undulations, e.g., with the undulations only in every other corrugation;

FIG. 8 shows the bump foil with a trapezoidal corrugation;

FIG. 9 shows the bump foil with a curved, e.g., quasi-sinusoidal corrugation;

FIG. 10 shows the bump foil with inwardly contoured sidewall undulations;

FIG. 11 shows the bump foil with inwardly and outwardly contoured sidewall undulations;

FIG. 12 shows the bump foil with trapezoidal sidewall undulations;

FIG. 13 shows the bump foil with sidewall undulations formed of linear and curved sections;

FIG. 14 shows the bump foil with sidewall undulations having two individual waves, e.g., in a form of S-shaped undulations with two waves;

FIG. 15 shows the bump foil with sidewall undulations having more than two individual waves, e.g., in a form of M-shaped undulations with three waves having curved peaks;

FIG. 16 shows the bump foil with differently-shaped sidewall undulations in a corrugation shaped as a symmetric triangle;

FIG. 17 shows the bump foil with differently-shaped sidewall undulations in a corrugation shaped as an asymmetric triangle;

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
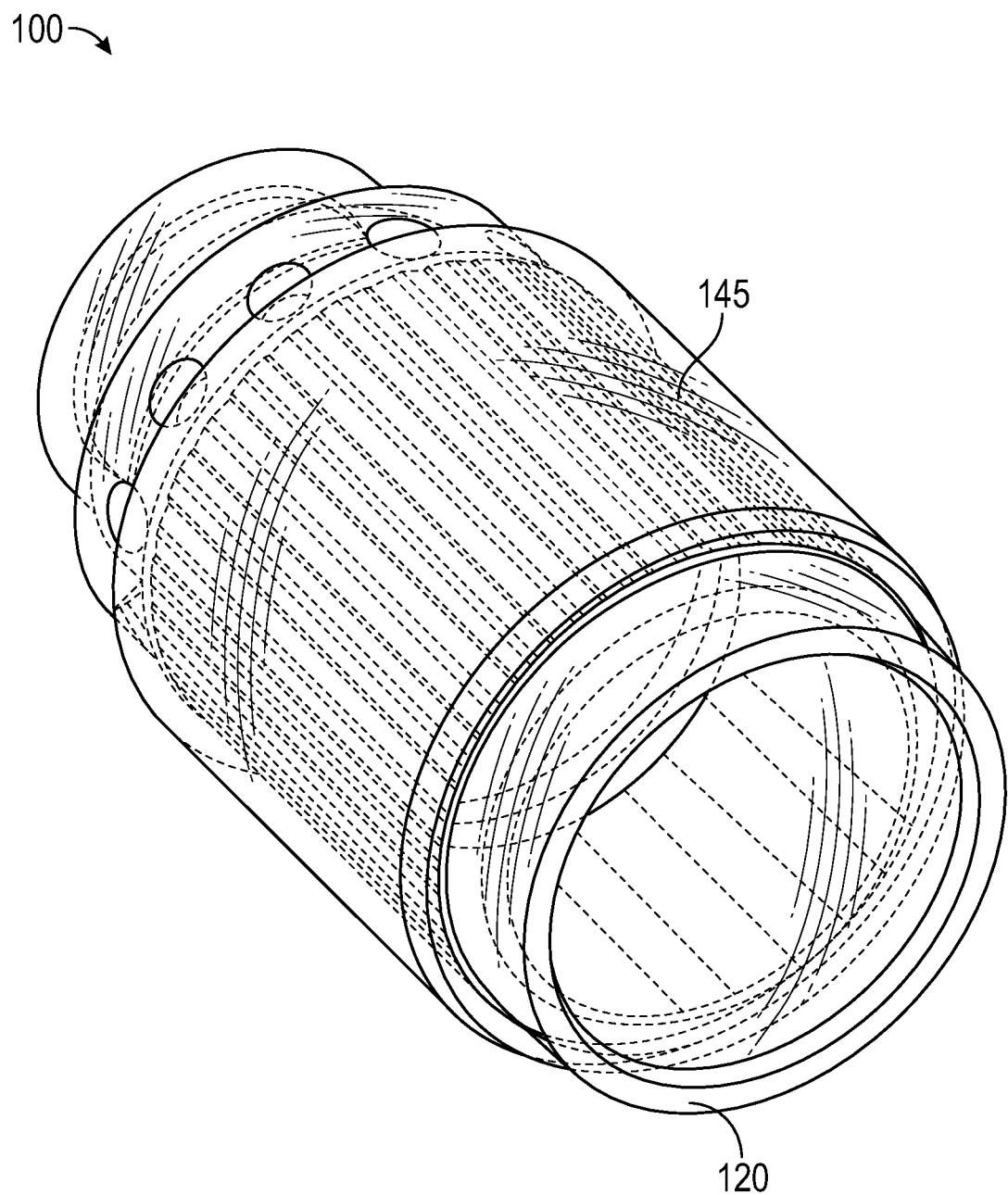
FIG. 1 shows a perspective view of a journal bearing according to an embodiment.
Figure 2:
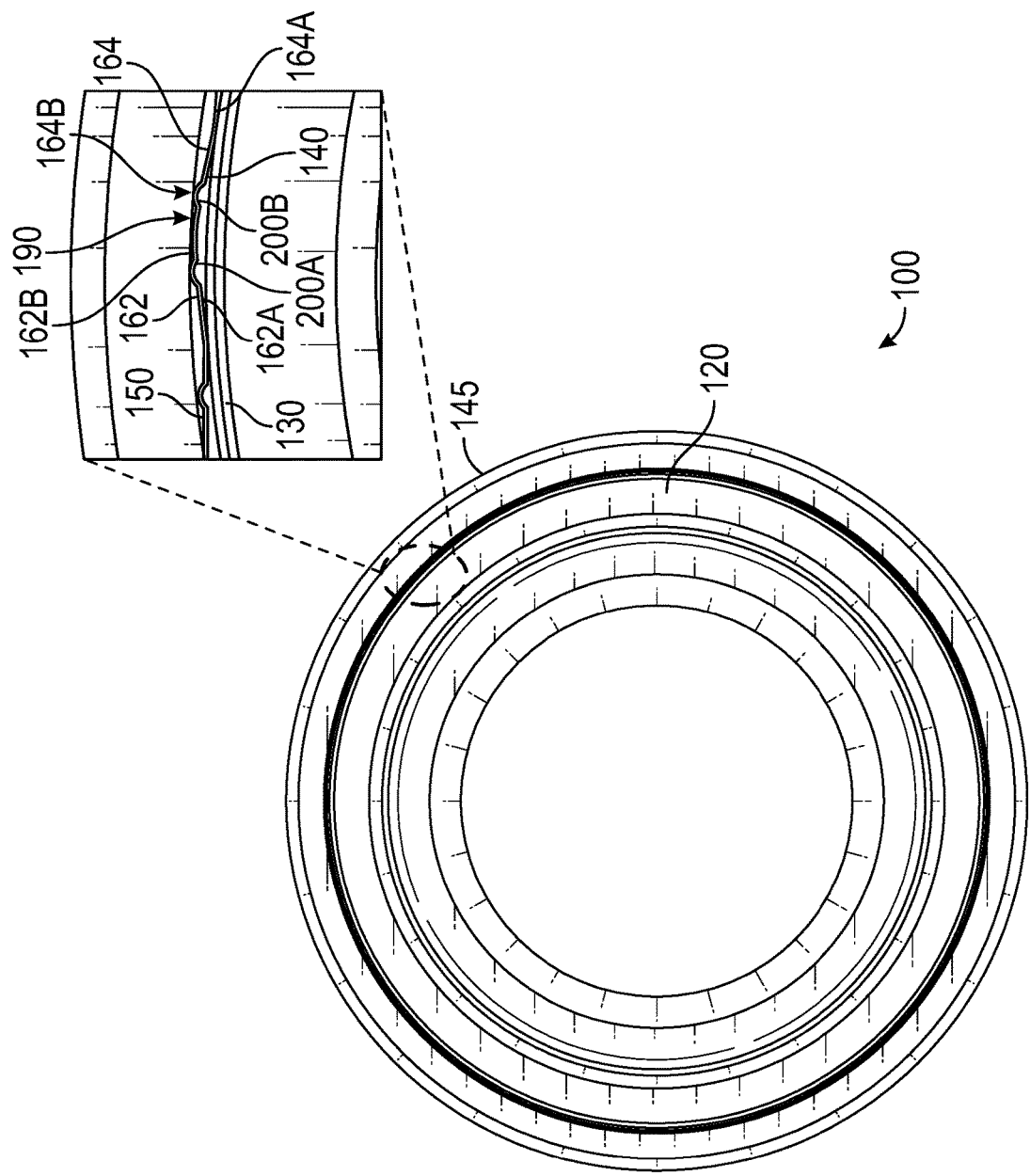
FIG. 2 shows a front axial view and a detail of the journal bearing.

Turning to FIGS. 1 and 2, a foil journal bearing (FJB) 100, which is a type of rotor-bearing system (RBS), is shown. The FJB 100 has a shaft 120, a top foil 130 surrounding the shaft 120 in the circumferential direction, a bump foil 140 surrounding the top foil 130 in the circumferential direction, and a bearing sleeve 145 surrounding the bump foil 140. The bump foil 140 is an annulus, e.g., it is a ring-shaped object, and it is formed with a profile defining corrugations 150, adjacently disposed, one after another, along the annulus. Each of the corrugations 150 includes a plurality of (or first and second) sidewalls 162, 164 that respectively converge from radial bottom (or inner) ends 162A, 164A adjacent to the top foil 130 to radial top (or outer) ends 162B, 164B adjacent to the bearing sleeve 45 to define a corrugation peak 190. The corrugations 150 may have sidewall undulations 200A, 200B, discussed in greater detail below.

As shown in FIG. 3, the corrugation 150 of the bump foil 140 may be in the form of a symmetric triangle waveform. A least one of the sidewalls 162, 164, such as sidewall 162, in at least one of the corrugations 150 (e.g., a first corrugation 150), includes one of the undulations 200A disposed midway between its bottom end 162A and top end 162B. As shown in FIG. 3, the sidewalls 162, 164 of the same corrugation 150 respectively has first and second undulations 200A, 200B that may be shaped the same as each other so that, for simplicity, reference will be made to the undulation 200A on the sidewall 162.

The undulation 200A defines a radial inner end 210A and a radial outer end 210B that are intermediate of the bottom end 162A and top end 162B of the sidewall 162. The undulation 200A may define a continuously curved profile, e.g., between its ends 210A, 210B. Each of the undulations 200A, 200B may extend or project outwardly, away from the top foil 130, i.e., toward the bearing sleeve 145 (FIG. 2), by a distance from the sidewalls 162, 164 to undulation peaks 205A, 205B. Such distance from the sidewalls 162, 164 to the undulation peaks 205A, 205B may define an offset distance from the sidewalls 162 and 164.

Variations of the geometrical implementations of corrugations with sidewall undulations with respect to sizing, curvatures, number of different sections of profiles, etc, are within the scope of this disclosure. The sidewalls can also be perforated, e.g., with a population of holes of different shapes, sizes and mutual arrangements, to have another set of design variables to control bending stiffness. Similarly, with respect to thickness, the undulations can be uniform or non-uniform. As disclosed in greater detail below, the embodiments provide permutations of bump foil undulations that allows the control the bump foil height, radii, number of undulations, shape of the undulations, and pitch of the undulations. These configurations provide a targeted dynamic stiffness and coulomb dampening for a given application.

As shown in FIG. 4, when the corrugation 150 is compressed between the top foil 130 and the bearing sleeve 145 (FIG. 2), the undulations 200A, 200B may flex outwardly to increase contact with the bearing sleeve 145. Alternatively, if the corrugation 150 expands radially outwardly, as shown in FIG. 5, then the undulations may tend to extend and increase a radial height of the corrugation 150 and the undulations 200A, 200B may be drawn or biased inwardly relative to the location of its peaks 205A, 205B in the normal state (FIG. 3). The outward and inward expansion of undulations increases contact pressure, hence increasing coulomb dampening. The outward expansion of the undulation also results in overall stiffness of the bearing. This general principle applies to all the undulation variations disclosed herein.

FIG. 6 shows the bump foil 140 that may be utilized in the FJB 100. The bump foil 140 is against the top foil 130, and each of the corrugations 150 with the undulations 200A, 200B in its sidewalls 162, 164 has the configuration as shown in FIG. 3. FIG. 7 shows the bump foil 140 that may be utilized in the FJB 100. The bump foil 140 is against the top foil 130, alternating the corrugations 150 have the undulations 200A, 200B in its sidewalls 162, 164 and are without the undulations. There can be scenarios where every two (or N) corrugations with undulations are alternated with M corrugations without undulations. FIG. 8 shows a corrugation 150 of the bump foil 140 that may be utilized in the FJB 100. The corrugation 150 has the undulations 200A, 200B with the same shape and positioning on the sidewalls 162, 164 as shown in FIG. 3. The corrugation 150, however, is shaped as a trapezoidal waveform. FIG. 9 shows a corrugation 150 of the bump foil 140 that may be utilized in the FJB 100. The corrugation 150 has the undulations 200A, 200B with the same shape and positioning on the sidewalls 162, 164 as shown in FIG. 3. The corrugation 150, however, is shaped as a sinusoidal or quasi-sinusoidal waveform having curved segments along its profile, having either continuous or variable curvatures along the profile length.

FIG. 10 shows a corrugation 150 of the bump foil 140 that may be utilized in the FJB 100. The corrugation 150 has the same shape as the corrugation shown in FIG. 3, with undulations 200A, 200B having the same positioning on the sidewalls 162, 164 as shown in FIG. 3. While the overall sizes and shape of the undulations 200A, 200B is the same as that in FIG. 3, the undulations 200A, 200B extends inwardly from the sidewalls 162, 164 toward the top foil 103. As shown in FIG. 11, which is similar to FIG. 10, one of the undulations 200A extends outwardly, away from the top foil 130 as with FIG. 3, and another one 200B extends inwardly, as with FIG. 10.

FIG. 12 shows a corrugation 150 of the bump foil 140 that may be utilized in the FJB 100. The corrugation 150 has the same shape as the corrugation in FIG. 3. The undulations 200A, 200B on the sidewalls, 162, 164 have the same positioning on the sidewalls 162, 164 and are sized, from the inner to outer undulation ends 210A, 210B, the same as the undulations shown in FIG. 3. However, the undulations 200A, 200B define a trapezoidal profile. The undulation peaks 205A, 205B of the undulations 200A, 200B may be the same size, e.g., with respect to the distance from the sidewalls 162, 164, as the undulation peaks 205A, 205B in FIG. 3.

FIG. 13 shows a corrugation 150 of the bump foil 140 that may be utilized in the FJB 100. The corrugation 150 has the same shape as the corrugation in FIG. 3. The undulations 200A, 200B on the sidewalls, 162, 164 have the same positioning on the sidewalls 162, 164 and are sized, from the undulation inner to outer ends 210A, 210B, the same as the undulations shown in FIG. 3. However, the undulations 200A, 200B each extend outwardly and define a profile that includes a plurality of linear segments 220A, 220B extending the sidewalls 162, 164 and a curved portion 230 joining the plurality of linear segments 220A, 220B. The size of the undulation peaks 205A, 205B of the undulations 200A, 200B in FIG. 13, with respect to the offset distance from the sidewalls 162, 164, may be greater than the undulation peaks 205A, 205B in FIG. 3.

FIG. 14 shows a corrugation 150 of the bump foil 140 that may be utilized in the FJB 100. The corrugation 150 has the same shape as the corrugation in FIG. 3. The undulations 200A. 200B on the sidewalls 162, 164 have the same positioning on the sidewalls 162, 164 as with FIG. 3. The undulations 200A, 200B define an S-shaped profile, having two connected individual waves extending inwardly and outwardly, respectively, and extend, from the undulation inner to outer ends 210A, 210B, by a distance that is less than a length of the sidewalls 162, 164, though greater than the undulations 200A, 200B in FIG. 3. The size of the undulation peaks 205A, 205B of the undulations 200A, 200B in FIG. 14, with respect to the offset distance from the sidewalls 162, 164, may be less than the undulation peaks 205A, 205B in FIG. 3.

FIG. 15 shows a corrugation 150 of the bump foil 140 that may be utilized in the FJB 100. The corrugation 150 has the same shape as the corrugation in FIG. 3. The undulations 200A, 200B on the sidewalls, 162, 164 have the same positioning on the sidewalls 162, 164. The undulations 200A, 200B define a profile, having more than two connected individual waves extending inwardly and outwardly, one after another, respectively, having arcuate vertexes and extend, from the undulation inner to outer ends 210A, 210B, by a distance that is less than a length of the sidewalls 162, 164, though greater than the undulations 200A, 200B in FIG. 3. The size of the undulation peaks 205A, 205B of the undulations 200A, 200B in FIG. 15, with respect to the distance from the sidewalls 162, 164, may be less than the undulation peaks 205A, 205B in FIG. 3.

FIG. 16 shows a corrugation 150 of the bump foil 140 that may be utilized in the FJB 100. The corrugation 150 has the same shape as the corrugation in FIG. 3. The undulations 200A, 200B on the sidewalls, 162, 164 have the same positioning on the sidewalls 162, 164 and are sized, from the undulation inner to outer ends 210A, 210B, the same as the undulations shown in FIG. 3. The undulations 200A, 200B have different shapes from each other. One undulation 200A may extend outwardly by a distance to its undulation peak 205A that is greater than the outward projection 205A of the undulation 200A of FIG. 3. The other undulation 200B may extend outwardly by a distance to its undulation peak 205B that is less than the outward projection 205B of the undulation 200B of FIG. 3.

FIG. 17 shows a corrugation 150 of the bump foil 140 that may be utilized in the FJB 100. The corrugation 150 has an asymmetric shape though its undulation peak 190 may be at a same height, e.g., relative to the top foil 130, as the corrugation in FIG. 3. The undulations 200A, 200B on the sidewalls, 162, 164 have the same positioning on the sidewalls 162, 164 and are sized and shaped the same as the undulations in FIG. 16.

Figure 18:
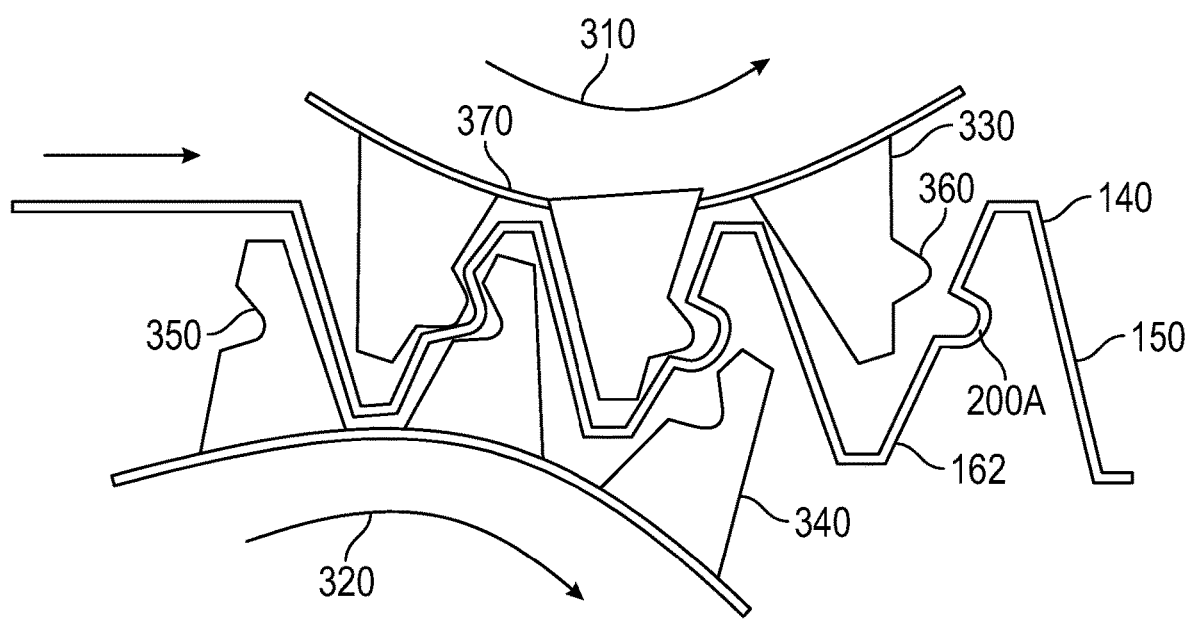
FIG. 18 shows a system for forming the bump foil with sidewall undulations in the corrugations.

FIG. 18 shows an apparatus 300 manufacturing the bump foil 140 with a trapezoidal shaped corrugation 150 with an internally extending undulations 200A on one of the sidewalls 162. Rollers 310, 320, each with set of teeth 330, 340 are configured to mesh with each other. One of the set of teeth 330 defines a cavity 350 while the other of the sets of teeth 340 defines a protrusion 360. The teeth 330, 340 are separated on each roller 310, 320 to define a smooth roller surface 370 therebetween. Running the bump foil 140 through the rollers 310, 320 imparts the bump foil 140 with the trapezoidal shaped corrugation 150 and with an internally extending undulations 200A on one of the sidewalls 162.

Figure 19:
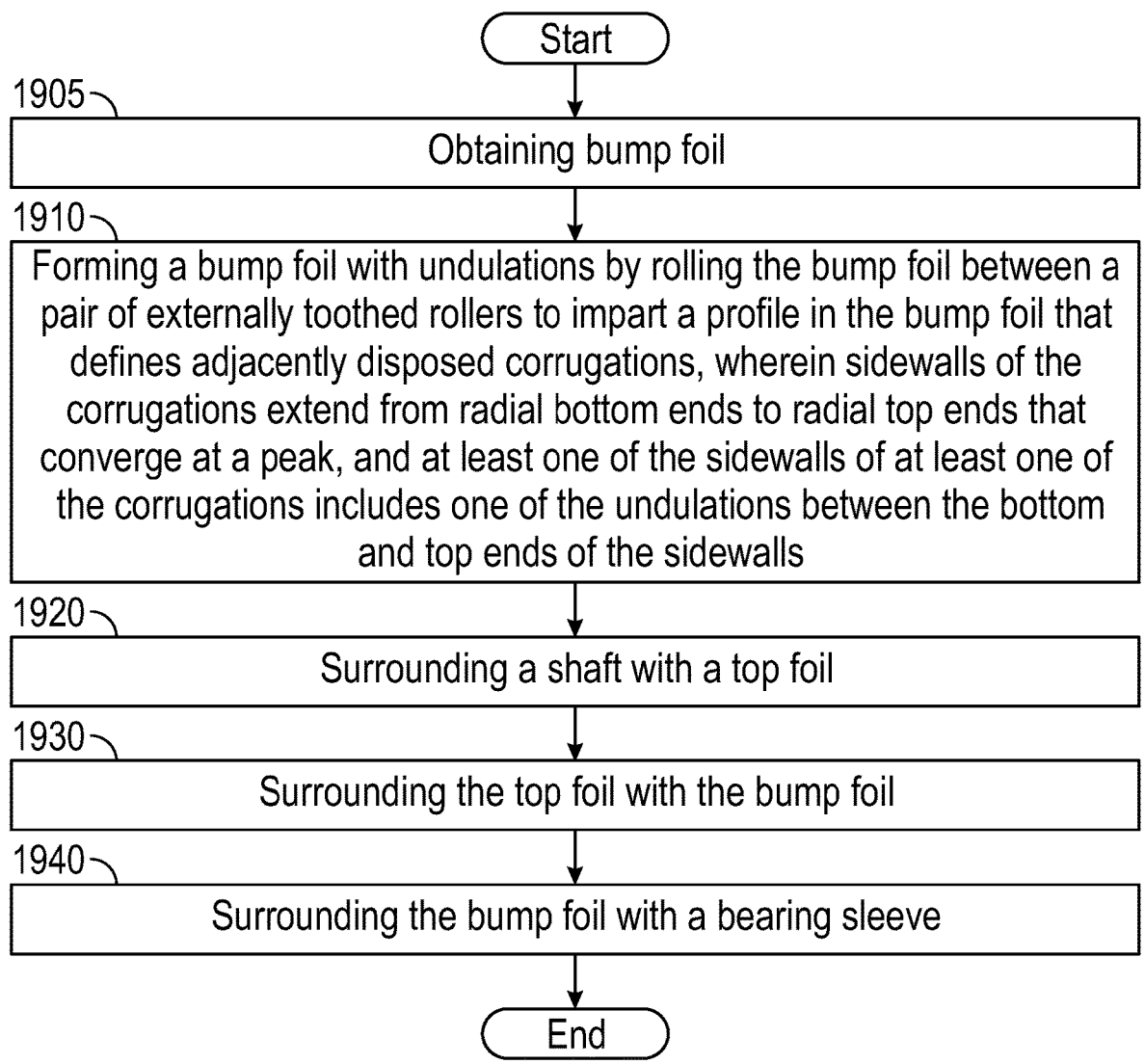
FIG. 19 is a flowchart showing a method of manufacturing and assembling a foil journal bearing that includes the bump foil with sidewall undulations in the corrugations.

FIG. 19 shows a method of manufacturing a foil journal bearing 100. As shown in block 1905, the method includes obtaining bump foil. As shown in block 1910, the method includes forming a bump foil 140 with the undulations 150 by rolling the bump foil 140 between a plurality of externally toothed rollers 310, 320 to impart a profile in the bump foil 140 that defines adjacently disposed corrugations 150. The corrugations 150 include sidewalls 162, 164 that extend from radial bottom ends 162A, 164A to radial top ends 162B, 164B that converge at a corrugation peak 190. At least one of the sidewalls 162 on at least one of the corrugations 150 includes one of the undulations 200A between the bottom end 162A and the top end 162B. As shown in block 1920, the method includes surrounding a shaft 120 with a top foil 130. As shown in block 1930, the method includes surrounding the top foil 130 with the bump foil 140. As shown in block 1940, the method includes surrounding the bump foil 140 with the bearing sleeve 145.

The embodiments provide configuration of a rotor-bearing system (RBS), which in the illustrated embodiments is a foil journal bearing (FJB) 100 having a bump foil 140 formed with a nonuniformity or undulations 200A, 200B in its corrugations 150, to enhance stiffness and damping of the FJB 100. Modifying the non-uniformity in the corrugations 150 of the bump foil 140 results in tuning a stiffness of the bump foil 140, and improves coulomb damping, by increasing a contact surface area between the mating surfaces on the bump foil 140 and radially adjacent bearing sleeve 145. As a result, there is an overall improved load-capacity of the FJB 100 to support dynamic operational loads of turbomachinery. It is to be appreciated that the configuration of the embodiments may be applied to foil thrust bearings (FTB), another type of RBS.

The disclosure provides different profiles for configurations of bump foil 140, with a top foil 130 having a uniform inner diameter and is radially exterior to a shaft of the bearing, and a bump foil 140 disposed between the top foil 130 and a bearing sleeve 145. The disclosed profiles of the corrugation 150 of the bump foil 140 provide for a self-adjusting of radial positioning when the bump foil 140 is installed, and pre-loaded, within the bearing sleeve 145. Specifically, the bump foil 140 includes circumferentially adjacent corrugations 150, both of which defines sidewalls 162, 164 with a corrugation peak 190 or vertex at the junction between the sidewalls 162, 164. The corrugation peak 190 is radially spaced apart from the top foil 130 and radially against the bearing sleeve 145. The undulations 200A, 200B formed on the sidewalls 162, 164 of the corrugations 150 of the bump foil 140 improves an overall spring stiffness of the bump foil 140. Hydrodynamic pressure on the top foil 130 energizes the bump foil 140 and further increases the contact pressure between the undulated corrugations 150 and the mating surfaces between the bump foil 140 and the bearing sleeve 145. These pressures increase the dynamic coulomb damping of the rotor-bearing system (RBS). The reaction force generated by the FJB 100, resulting from the undulations 200A, 200B, resists dynamic loading. Furthermore, the increased contact area between corrugations 150 and mating surfaces, between the bump foil 140 and bearing sleeve 145, improves a spring rate of the bump foil and hysteresis damping, also known as static damping, of the FJB 100.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A foil journal bearing, comprising:
   a shaft;
   a top foil surrounding the shaft in a circumferential direction;
   a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and
   a bearing sleeve surrounding the corrugated bump foil, wherein:
   at least one of the sidewalls of at least one of the corrugations includes an undulation disposed between the outer and inner radial ends of the sidewall; and
   the undulation is defined by an undulation outer end and an undulation inner end,
   wherein:
   the bump foil includes alternating corrugations with sidewall undulations and corrugations without sidewall undulations.

2. The bearing of claim 1, wherein the corrugations define a triangular shape.

3. The bearing of claim 1, wherein the corrugations define a trapezoidal waveform.

4. The bearing of claim 1, wherein the corrugations define a sinusoidal or quasi-sinusoidal waveform having curved segments along its profile, having either continuous or variable curvatures along the profile length.

5. The bearing of claim 1, wherein:
   the undulation of the at least one of the corrugations extends outwardly from the at least one of the sidewalls, away from the top foil.

6. The bearing of claim 1, wherein:
   both of the sidewalls of the at least one of the corrugations includes the undulations, wherein the undulations extend outwardly, away from the top foil.

7. The bearing of claim 1, wherein:
   the undulation of the at least one of the sidewalls extends inwardly, toward the top foil.

8. The bearing of claim 1, wherein:
   both of the sidewalls of the at least one of the corrugations includes the undulations, wherein the undulations extend inwardly, toward the top foil.

9. The bearing of claim 1, wherein:
   the undulation of the at least one of the corrugations defines a continuously curved profile.

10. The bearing of claim 1, wherein:
    the undulation of the at least one of the corrugations defines a profile that includes a plurality of linear segments extending away from the top foil and a curved portions joining the plurality of linear segments.

11. The bearing of claim 1, wherein:
    the corrugations define a symmetric triangular waveform; and
    the sidewalls of the at least one of the corrugations includes the undulations that extend outwardly, away from the top foil, and the undulations have the same shape as each other.

12. A foil journal bearing, comprising:
a shaft;
a top foil surrounding the shaft in a circumferential direction;
a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and
a bearing sleeve surrounding the corrugated bump foil, wherein:
at least one of the sidewalls of at least one of the corrugations includes an undulation disposed between the outer and inner radial ends of the sidewall; and
the undulation is defined by an undulation outer end and an undulation inner end,
wherein:
each of the sidewalls of the at least one of the corrugations includes the undulations, wherein one of the undulations extends outwardly, away from the top foil, and another one of the undulations extend inwardly, toward the top foil.

13. A foil journal bearing, comprising:
a shaft;
a top foil surrounding the shaft in a circumferential direction;
a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and
a bearing sleeve surrounding the corrugated bump foil, wherein:
at least one of the sidewalls of at least one of the corrugations includes an undulation disposed between the outer and inner radial ends of the sidewall; and
the undulation is defined by an undulation outer end and an undulation inner end,
wherein:
the undulation of the at least one of the corrugations defines a trapezoidal profile.

14. A foil journal bearing, comprising:
a shaft;
a top foil surrounding the shaft in a circumferential direction;
a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and
a bearing sleeve surrounding the corrugated bump foil, wherein:
at least one of the sidewalls of at least one of the corrugations includes an undulation disposed between the outer and inner radial ends of the sidewall; and
the undulation is defined by an undulation outer end and an undulation inner end,
wherein:
the undulation of the at least one of the corrugations defines an S-shaped profile, comprising two connected individual waves extending inwardly and outwardly, respectively.

15. A foil journal bearing, comprising:
a shaft;
a top foil surrounding the shaft in a circumferential direction;
a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and
a bearing sleeve surrounding the corrugated bump foil, wherein:
at least one of the sidewalls of at least one of the corrugations includes an undulation disposed between the outer and inner radial ends of the sidewall; and
the undulation is defined by an undulation outer end and an undulation inner end,
wherein:
the undulation of the at least one of the corrugations defines a profile, comprising more than two connected individual waves extending inwardly and outwardly, one after another, respectively.

16. A foil journal bearing, comprising:
a shaft;
a top foil surrounding the shaft in a circumferential direction;
a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and
a bearing sleeve surrounding the corrugated bump foil, wherein:
at least one of the sidewalls of at least one of the corrugations includes an undulation disposed between the outer and inner radial ends of the sidewall; and
the undulation is defined by an undulation outer end and an undulation inner end,
wherein:
the corrugations define a symmetric triangular waveform; and
the sidewalls of the at least one of the corrugations includes the undulations, wherein the undulations extend outwardly, away from the top foil, and one of the undulations has a different shape than another one of the undulations.

17. A foil journal bearing, comprising:
a shaft;
a top foil surrounding the shaft in a circumferential direction;
a corrugated bump foil surrounding the top foil in the circumferential direction, wherein the corrugated bump foil includes a plurality of adjacent corrugations that each include sidewalls that extend from a radial inner end to a radial outer end of the corrugated bump foil; and
a bearing sleeve surrounding the corrugated bump foil, wherein:
at least one of the sidewalls of at least one of the corrugations includes an undulation disposed between the outer and inner radial ends of the sidewall; and
the undulation is defined by an undulation outer end and an undulation inner end,
wherein:
the corrugations define an asymmetric triangular waveform; and the sidewalls of the at least one of the corrugations includes the undulations that extend outwardly, away from the top foil, and have the same or a different shape from each other.

18. A method of manufacturing the foil journal bearing of claim 1, comprising:
  obtaining bump foil; and
  forming the corrugated bump foil with undulations by:
    rolling the bump foil between a pair of externally toothed rollers to impart a profile in the bump foil that defines adjacently disposed corrugations,
  surrounding the shaft with the top foil;
  surrounding the top foil with the bump foil; and
  surrounding the bump foil with the bearing sleeve.

* * * * *